(12) United States Patent
Böge (10) Patent No.: US 7,121,015 B2
(45) Date of Patent: Oct. 17, 2006

(54) LENGTH MEASURING DEVICE (75) Inventor: Ludwig Böge, Jenapriessnitz (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/524,170

(22) PCT Filed: Jun. 27, 2003

(86) PCT No.: PCT/EP03/06845

§ 371 (c)(1),
(2), (4) Date: Oct. 3, 2005

(87) PCT Pub. No.: WO2004/018973

PCT Pub. Date: Mar. 4, 2004

(65) Prior Publication Data

US 2006/0107545 A1    May 25, 2006

(30) Foreign Application Priority Data

Aug. 8, 2002    (DE) .............................. 102 36 381

(51) Int. Cl.
G01B 11/04    (2006.01)

(52) U.S. Cl. .............................. 33/707; 33/700; 33/712

(58) Field of Classification Search .......... 33/706–707, 33/700, 712, 702–704, 758
See application file for complete search history.

(56) References Cited

U.S. PATENT DOCUMENTS

| | | | |
|---|---|---|---|
| 5,979,238 A | 11/1999 | Boege et al. | |
| 6,049,992 A | 4/2000 | Freitag et al. | |
| 6,092,296 A * | 7/2000 | Nelle | 33/706 |
| 6,349,481 B1 | 2/2002 | Nelle | |
| 2004/0103551 A1* | 6/2004 | Wahl et al. | 33/707 |
| 2004/0261283 A1* | 12/2004 | Falkinger et al. | 33/707 |

FOREIGN PATENT DOCUMENTS

| | | |
|---|---|---|
| DE | 2 249 936 A | 4/1974 |
| DE | 196 11 983 C1 | 7/1997 |
| DE | 197 00 367 A1 | 7/1998 |
| DE | 199 14 311 A1 | 10/2000 |

\* cited by examiner

Primary Examiner—Yaritza Guadalupe-McCall
(74) Attorney, Agent, or Firm—Brinks Hofer Gilson & Lione (57) ABSTRACT A linear measuring device including a housing fastened to a first machine element and a scale within the housing, wherein the scale is fastened extending along the housing in a measuring direction. A scanning device for scanning a scale. A linear guide device including a guide rail, which is rigidly assigned to the housing; and a guide carriage, which is guided on the guide rail along the housing in the measuring direction, and includes a fastener to fasten the guide carriage rigidly on a second machine element. The housing is structured so that during measuring operations it is deflected perpendicular to the measuring direction, so that in the course of movement of the guide carriage in a direction perpendicular to the measuring direction the housing is taken along in the direction perpendicular to the measuring direction.

12 Claims, 6 Drawing Sheets

LENGTH MEASURING DEVICE

Applicant claims, under 35 U.S.C. §§ 120 and 365, the benefit of priority of the filing date of Jun. 27, 2003 of a Patent Cooperation Treaty patent application, copy attached, Ser. No. PCT/EP2003/006845, filed on the aforementioned date, the entire contents of which are incorporated herein by reference, wherein Patent Cooperation Treaty patent application Ser. No. PCT/EP2003/006845 was not published under PCT Article 21(2) in English.

Applicant claims, under 35 U.S.C. § 119, the benefit of priority of the filing date of Aug. 8, 2002 of a German patent application, copy attached, Ser. No. 102,363,811, filed on the aforementioned date, the entire contents of which are incorporated herein by reference.

BACKGROUND OF THE INVENTION

1. Field of the Invention

The present invention relates to a linear measuring device for measuring the relative position of a first machine element with respect to a second machine element. The first machine element is a base of a machine tool, for example, and the second machine element is the machine carriage which can be displaced with respect to the base.

2. Description of the Related Art

For the exact position measurement in connection with machine tools and coordinate measuring machines, the scales, or the scale supports, are elaborately fastened, aligned parallel with the measuring direction, wherein the measuring direction is predetermined by the guide system of the machine tool or the measuring machine. A step for alignment is described in DE 199 14 311 A1 and DE 197 00 367 A1, for example.

However, in connection with linear measuring devices, wherein the scale has been protectively arranged in a housing, these steps cannot be taken at all, or only with difficulty.

SUMMARY AND OBJECTS OF THE INVENTION

It is therefore an the object of present invention to disclose a linear measuring device wherein the housing, together with the scale arranged in it, can be aligned parallel with the machine guidance device in a simple manner.

In accordance with the present invention, this object is attained by a linear measuring device for measuring a relative position of a first machine element with respect to a second machine element. The device includes a housing fastened to the first machine element and a scale within the housing, wherein the scale is fastened extending along the housing in a measuring direction. A scanning device for scanning a scale. A linear guide device including a guide rail, which is rigidly assigned to the housing and includes a guide area; and a guide carriage, which supports the scanning device and is guided on the guide rail along the housing in the measuring direction, wherein the guide carriage is connected to the guide rail, free of play in all directions perpendicular to the measuring direction and the guide carriage includes a fastener to fasten the guide carriage rigidly on the second machine element in the measuring direction and the all directions perpendicular to the measuring direction. The housing is structured so that during measuring operations it is deflected perpendicular to the measuring direction at least in the guide area, so that in the course of movement of the guide carriage in a direction perpendicular to the measuring direction the housing is taken along in the direction perpendicular to the measuring direction.

The present invention will be explained in greater detail by the drawings, wherein.

BRIEF DESCRIPTION OF THE DRAWINGS

DESCRIPTION OF THE PREFERRED EMBODIMENT(S) OF THE INVENTION

Encapsulated linear measuring devices will be described by FIGS. 1 to 5, wherein a scale 1, as well as a scanning device 2, are protectively arranged in the interior of a housing 3.

Figure 1:
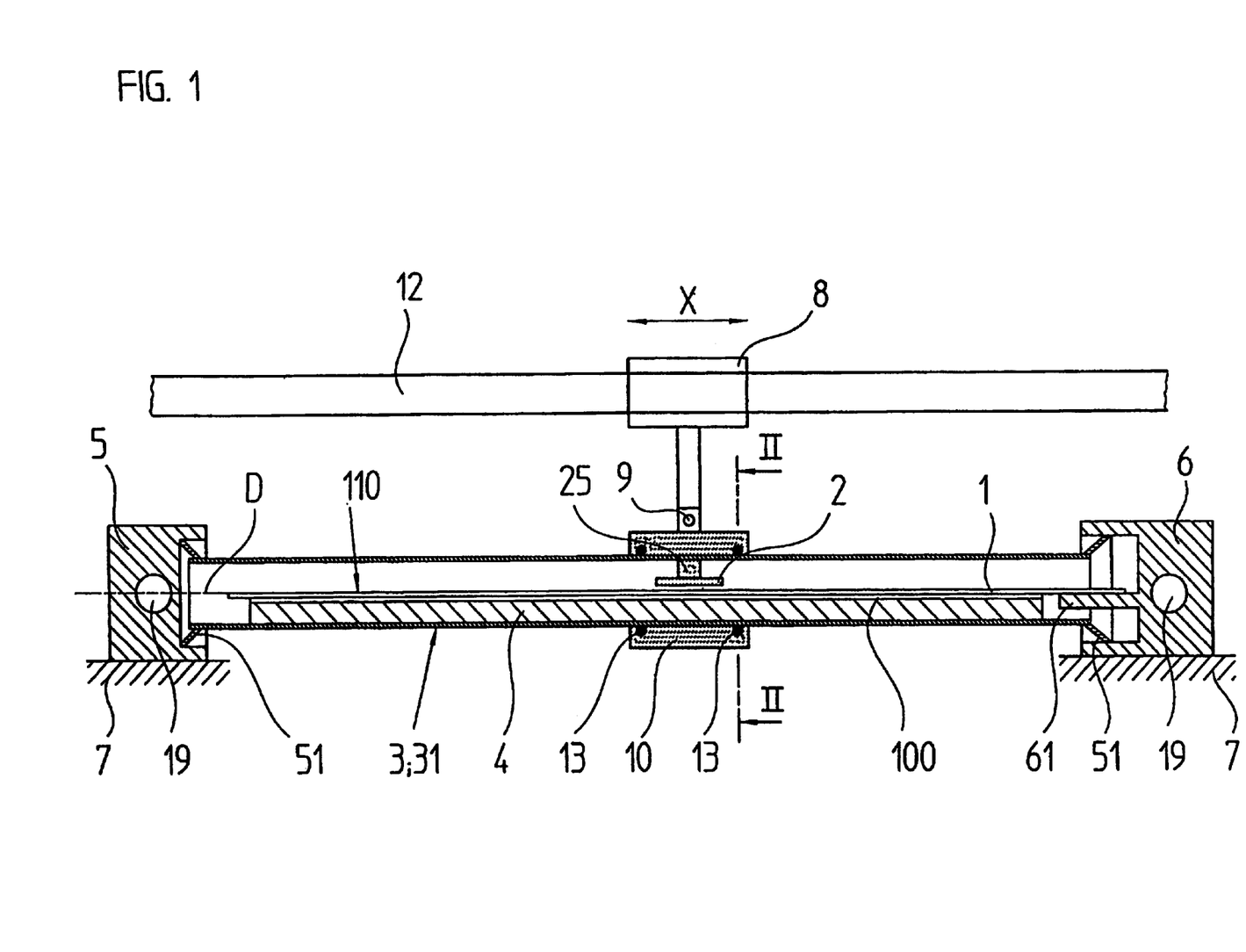
FIG. 1 represents an exemplary embodiment of a linear measuring device in longitudinal section in accordance with the present invention.
Figure 2:
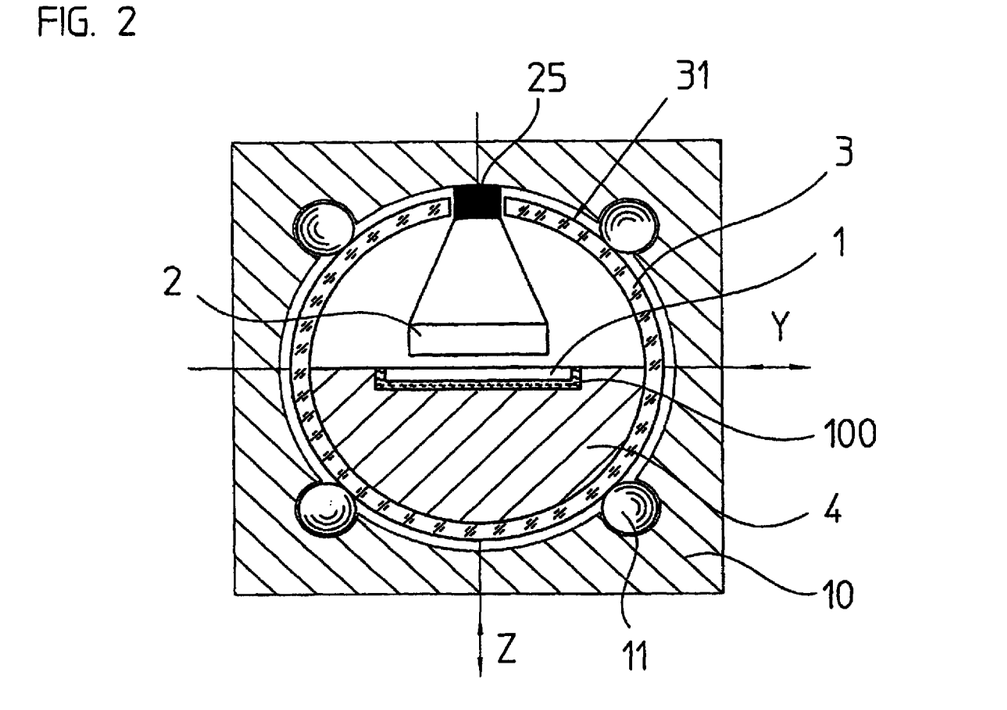
FIG. 2 is a cross-sectional view of the linear measuring device in accordance with FIG. 1 taken along line II—II of FIG. 1.

The linear measuring device in accordance with FIGS. 1 and 2 includes a housing 3, resistant to bending and having a circular-cylindrical circumferential area made, for example, of aluminum, plastic or steel. The scale 1 is fixed in place on the housing 3 by a support 4.

For position measuring, the housing 3 is fastened by mounting elements 5, 6 on a first machine element 7, whose position in relation to a second machine element 8 is to be measured. The design of the mounting elements 5, 6 will be described later in greater detail.

For position measuring, a guide carriage 10 is fastened on the second machine element 8 with fasteners 9—in particular srews-, on which the scanning device 2 for scanning the scale 1 is fastened in turn. Fastening of the guide carriage 10 on the second machine element 8 takes place rigidly in the measuring direction X and in all directions Y, Z, perpendicularly with respect to the measuring direction X.

The guide carriage 10 embraces the housing 3 on all sides, and the circumferential face of the housing constitutes a guide rail 31, along which the guide carriage 10 is guided, free of play, in the measuring direction X. The guide carriage 10 is connected to the housing 3, free of play in all directions Y, Z perpendicular with respect to the measuring direction X, by a spherical bushing 11. Other rolling guide devices, or also sliding guide devices, can be used in place of the spherical bushing 11.

Ring-type seals 13 for providing sealing between the guide carriage and the housing 3 are arranged on both ends of the guide carriage 10. A good seal is assured by employing encircling ring-type seals 13.

In the course of a position measurement, the guide carriage 10 is moved by the second machine element 8 in the measuring direction X, wherein the movement path is fixed by the machine guide element 12, which is only schematically represented in FIG. 1. The rigid connection in the measuring direction X, and in all directions perpendicular with respect thereto, of the guide carriage 10 to the second machine elements 8 assures an error-free transmission of this movement to the scanning device 2 rigidly connected to the guide carriage 10. Moreover, the guidance, free of play in all directions perpendicular with respect to the measuring direction X, of the guide carriage 10 on the housing 3 assures that the housing 3, and therefore the scale 1, takes up a defined position with respect to the machine guide element 12. It is therefore not absolutely necessary for the housing 3 to be installed parallel with the machine guide element 12 in a highly accurate manner. In case of a faulty alignment, the guide carriage 10 assures that the housing 3 is taken along, and therefore a correct alignment perpendicularly with respect to the measuring direction X.

To assure this alignment during measuring operations, the rigid housing 3 is fastened on the first machine element 7 by at least one mounting element 5, which has connectors 51 for the movable connection of the housing 3 in directions Y, Z perpendicularly with respect to the measuring direction X. These connectors 51 can be elastic elements 51 between the mounting element 5, which can be rigidly screwed to the first machine element 7, and the housing 3, wherein these elastic elements simultaneously can constitute a seal between the housing 3 and the mounting element 5.

The mounting element 6 assures a rigid connection of the housing 3 with the first machine element 7 in the measuring direction X, but permits transverse movements in all directions Y, Z. The mounting element 5 also permits transverse deviations of the housing 3 in all directions Y, Z, but also permits a linear compensation of the housing in relation to the mounting element 5. The mounting element 6 for the fastening of the housing 3 in a manner which is rigid in the measuring direction X and can be shifted perpendicularly with respect to it, contains a spring wire 61 or a rod, which has hinges in the form of weakened points.

The scale 1 is a steel tape, which has been adhesively fastened by an oil layer 100 or other viscous or elastic intermediate layer on the support 4, such as described in DE 196 11 983. However, a glass scale can also be employed. The scale 1 is rigidly fastened at a location in the measuring direction X on the housing 3 and/or on the mounting element 6 for forming a fixed point.

The mounting elements 5, 6 are rigidly screwed to the first machine element 7 through bores 19. A highly accurate alignment with respect to the machine guide element 12 is not absolutely required here.

The scale 1 is provided with an opto-electrically scannable measuring structure 110 for a highly accurate position measurement which, for forming position-dependent scanning signals, is scanned by a light source and a light-sensitive detector unit.

Figure 3:
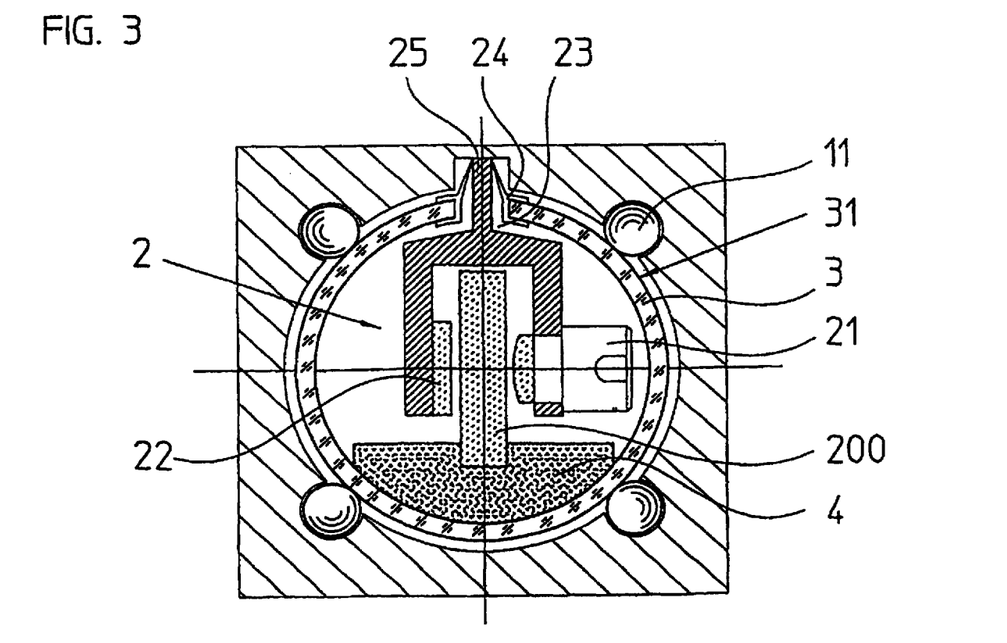
FIG. 3 is a cross-sectional view of a second embodiment of a linear measuring device in accordance with the present invention wherein the linear measuring device of FIG. 1 has been altered to include a transmitted light scanning device.

In place of incident light scanning represented in FIGS. 1 and 2 by a reflecting measuring structure 110, the employment of a scale 200 is also possible, which can be scanned by a transmitted light scanning process, such as represented in FIG. 3. In this case the scale 200 has again been fastened on the housing 3 via a support, or directly, and the scanning device 2 is placed protectively in the interior of the housing 3. On one side of the scale 200, the scanning device 2 has a light source 21, and on the other side of the scale 200 a light-sensitive detector 22. The housing 3 is slit, and this slit 23 is sealed by means ef an elastic seal 24, through which protrudes a sword-shaped connector 25, which rigidly connects the scanning device 2 with the guide carriage 10 in all directions X, Y, Z.

Figure 5:
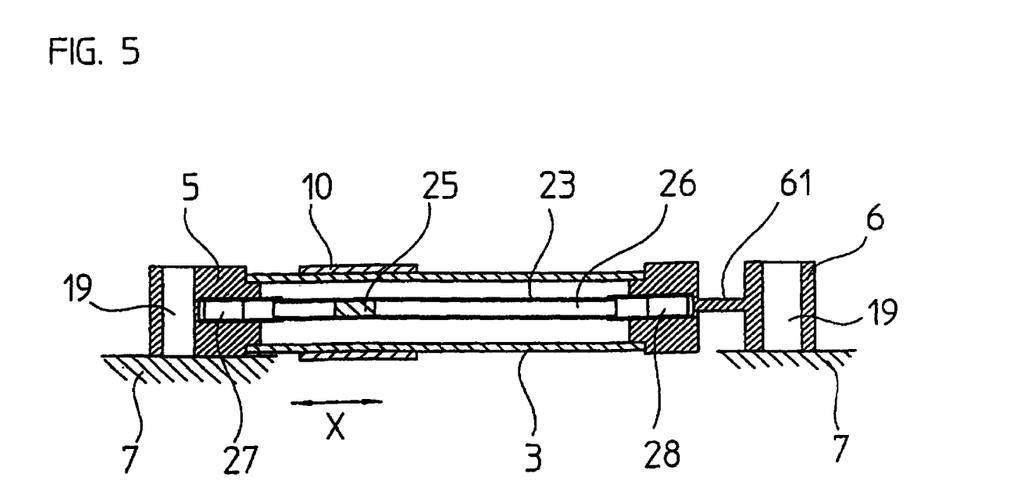
FIG. 5 is a fourth embodiment of a linear measuring device in accordance with the prsent invention wherein a protective tape as the covering is used with the linear measuring devices of FIGS. 1, 3 and 4.

The elastic seal 24 can be replaced by a cover tape 26. This cover tape 26 represented in FIG. 5 is guided in the slit 23, wherein it is fastened to the connector 25 on the one hand and, on the other, is seated on the housing 3 via reversing rollers 27, 28, so that, starting at the connector 25, it is conducted over the first reversing roller 27 to the second reversing roller 28 and back to the connector 25, and rotates.

Figure 4:
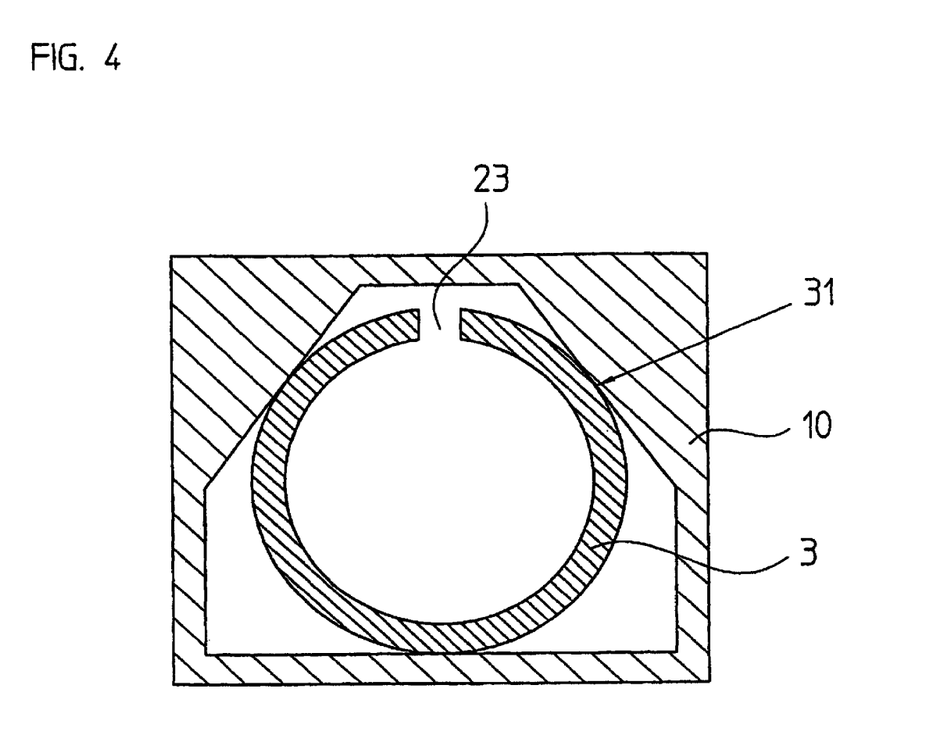
FIG. 4 is a cross-sectional view of a third embodiment of linear measuring device in accordance with the present invention wherein the linear measuring device of either FIG. 1 or FIG. 3 has been altered to include a modified linear guide device.

A modified linear guide device is represented in FIG. 4. Again, the guide rail is constituted by the circumferential face 31 of the housing 3 itself, but here the spherical bushing has been replaced by a sliding guide device, wherein the guide carriage 10 is supported at several circumferential areas, but particularly at three circumferential areas of the housing 3 which are offset by 120° with respect to each other, and is guided free of play.

Figure 6:
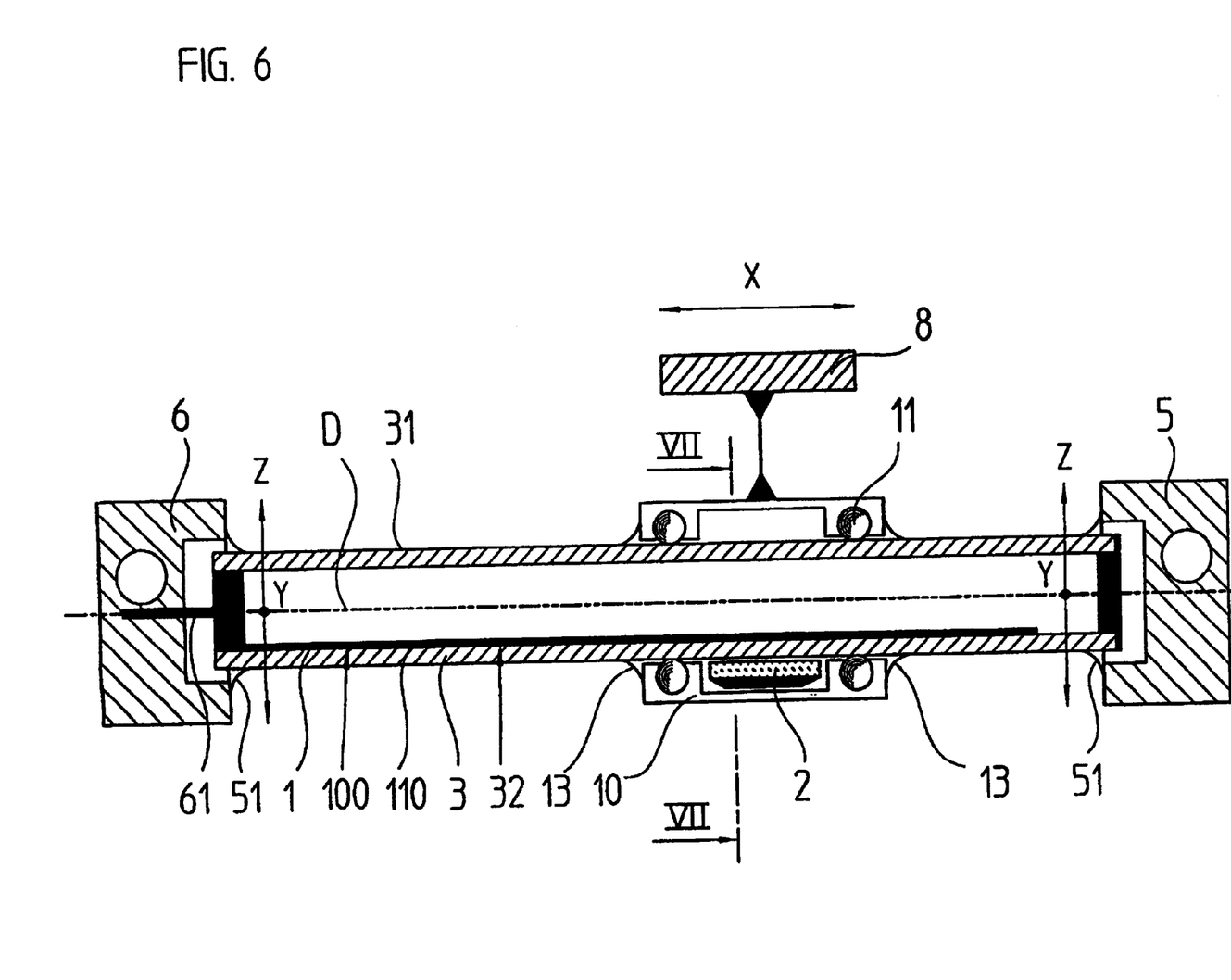
FIG. 6 is a fifth embodiment of a linear measuring device in longitudinal section with a scanning device outside of the housing in accordance with the present invention.
Figure 7:
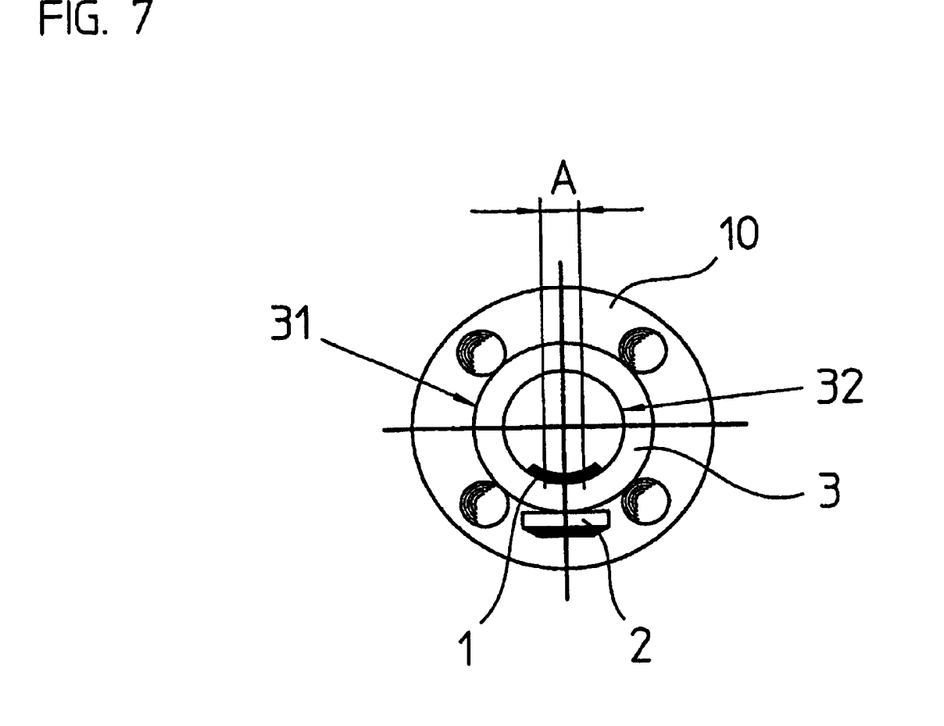
FIG. 7 is a cross-sectional view of the linear measuring device in accordance with FIG. 6 taken along line VII—VII of FIG. 6.

FIGS. 6 and 7 show a further exemplary embodiment of a linear measuring device. In comparison with the examples so far explained, the scanning device 2 is now outside of the housing 3.

Figure 8:
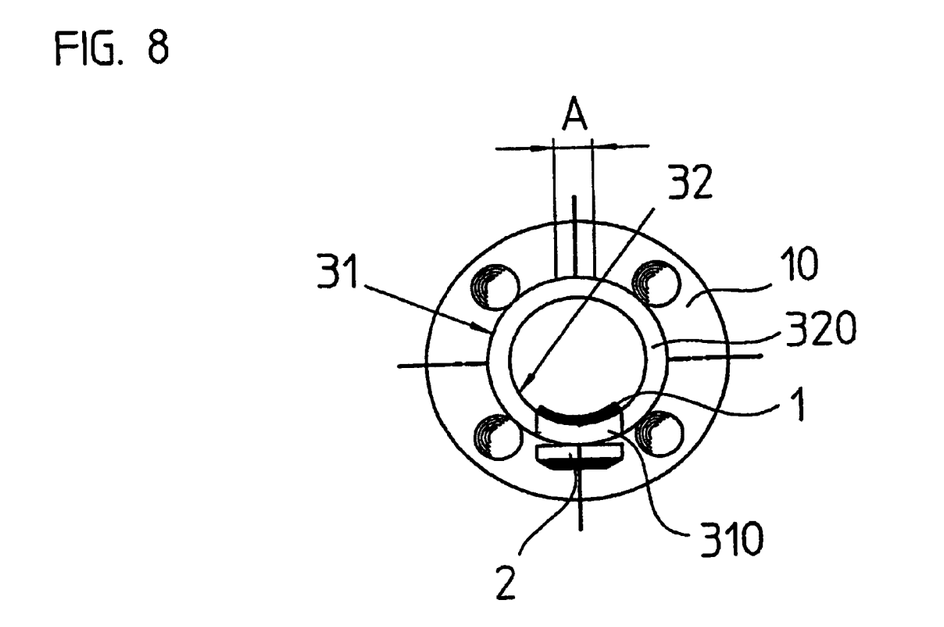
FIG. 8 is a cross-sectional view of of a sixth embodiment of a linear measuring device in accordance with the present invention wherein the linear measuring device in accordance with FIG. 6 has been altered to include a modified housing.

The housing 3 is tube-shaped and has a circular-cylindrical circumferential area 31. The scale 1, which can be scanned opto-electrically, is fastened in the interior of the housing 3 and preferably is a linearly rigid pre-curved steel tape, matched to the curvature of the inner wall 32, if required, and is fastened, adhering directly to the inner wall 32 of the housing 3 via an oil film 100. The measuring structure 110 of the scale 1 is scanned by the scanning device 2, which is fastened on the second machine element 8, rigid in all directions X, Y, Z, by means of the guide carriage 10. For scanning through the housing 3, the latter is transparent to the scanning light beam, at least in the circumferential scanning area A. Thus, the housing 3 can be embodied to be transparent over the entire circumference or, as represented in FIG. 8, can be transparent only partially in that, for example, a transparent segment 310 is inserted into a steel segment 320.

Guidance of the guide carriage 10 with the scanning device 2 takes place rigidly in directions Y, Z perpendicularly with respect to the measuring direction X, at the exterior circumference 31 of the housing 3, or at a separate guide rail rigidly assigned to the housing 3. The guide carriage 10 can be rigidly fastened on the second machine element 8 in the measuring direction X and in all directions perpendicularly with respect to the measuring direction X.

The housing 3, for example a glass tube—in particular a viscoplastic glass tube or a plastic tube, is embodied to be rigid and is fastened on the first machine element 7 by the mounting elements 5, 6. Both mounting elements 5, 6 maintain the housing 3 so it can be deflected perpendicularly with respect to the measuring direction X. The scale 1 is fastened, rigid in the measuring direction X, on a mounting element 6 for its definite fixation on the first machine element 7, to which end a spring wire 61 is again used, or a rod with joints, spaced apart in particular in the measuring direction X, in the form of weakened points.

For compensating an erroneous alignment between the machine guide element 12 and the scale 1 during measuring operations, a further step in accordance with the present invention is also advantageous. In this case the connectors 51, 61 between the rigid housing 3 and the mounting elements 5, 6 are constituted by the housing 30 itself in that the latter is designed to have low flexural strength. This embodiment is represented in principle in FIG. 9.

Figure 9:
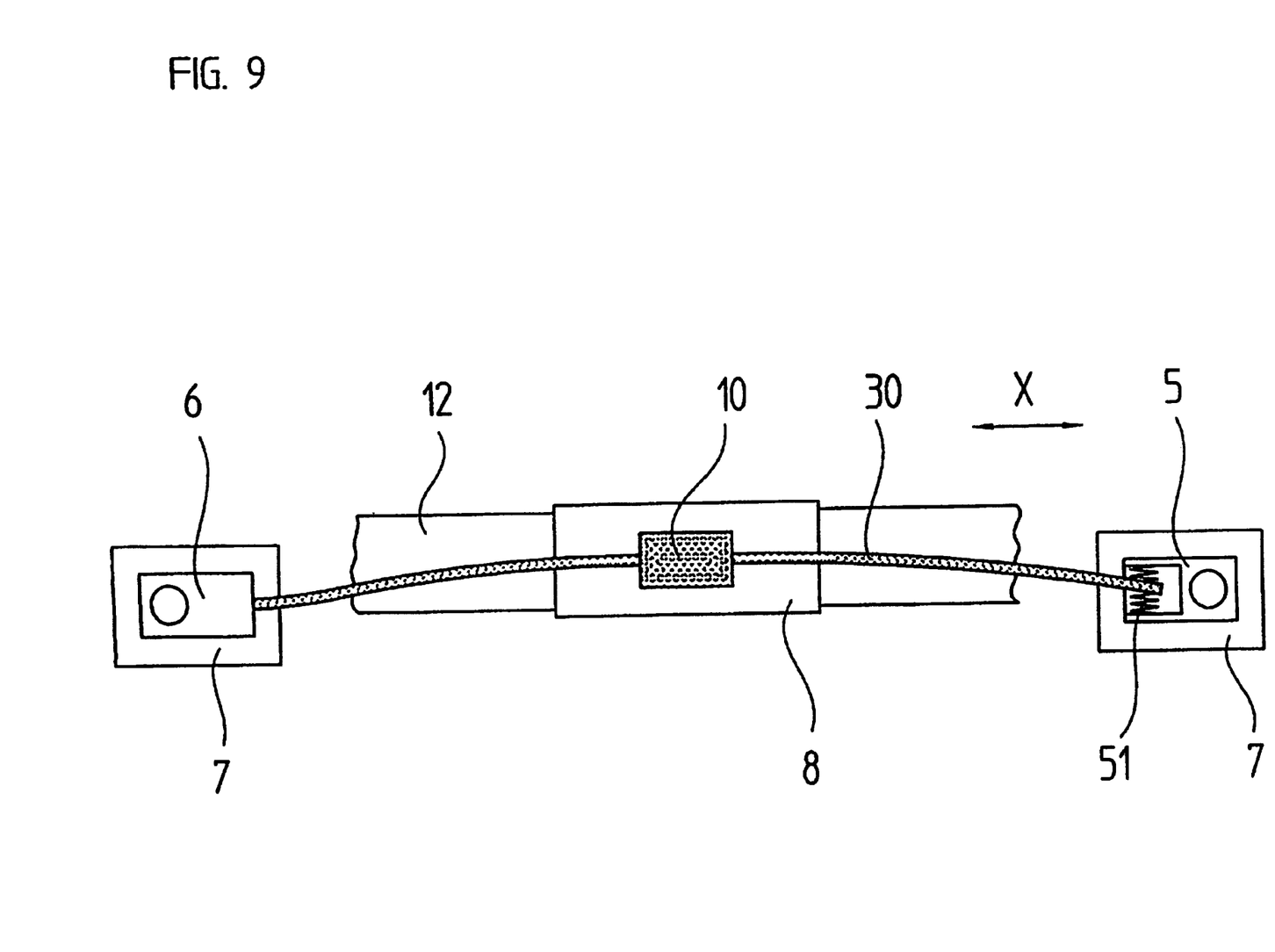
FIG. 9 is a basic representation of a seventh embodiment of a linear measuring device in accordance with the present invention wherein the linear measuring devices of FIGS. 1, 3, 4–6 and 8 have been altered so that their housing have a low flexural strength.

The guide rail is again constituted by the exterior face 31 of the housing 30 itself. It is alternatively possible to rigidly assign its own guide rail of low flexural strength to the housing 30. Again, the guide carriage 10 has been connected with the guide rail 31, free of play in the directions Y, Z perpendicularly with respect to the measuring direction X. The housing 30 advantageously has a circular-cylindrical circumferential area 31, which is embraced on all sides by the guide carriage 10 and wherein the circumferential area is used as the guide area 31. The guide carriage 10 has been connected with the guide rail 31, free of play in the directions Y, Z perpendicularly with respect to the measuring direction X. The scanning device 2 is rigidly fastened on the guide carriage 10, and the latter is fastened in turn on the second machine element 3, again rigid in all directions X, Y, Z. It is assured by housing 30 of low flexural strength, which for example can be made of plastic, that during measuring operations it can be deflected perpendicularly with respect to the measuring direction X, at least in the guide area, and therefore in the scanning area, so that in the course of a movement of the guide carriage 10 perpendicularly with respect to the measuring direction X, the housing 30 is taken along in this direction. One of the housing ends can be rigidly fastened on the first machine element 7 by means of a mounting element 6, and the other end can be fastened, linearly movable, on the first machine element 7 by a further mounting element 5.

The scale arrangements, scanning principles and designs of the guide elements explained in connection with FIGS. 1 to 8 can also be used with the example in accordance with FIG. 9.

In connection with all examples it is possible for the guide carriage 10 to be seated on the guide rail 31, rotatable around the longitudinal axis D of the housing 3, 30. This rotary degree of freedom can be alternatively created in that the housing 3, 30 is seated in the mounting elements 5, 6, rotatable around this longitudinal axis D.

Further embodiment variations of the method in accordance with the present invention of course exist besides the explained example.

I claim:

1. A linear measuring device for measuring a relative position of a first machine element with respect to a second machine element, comprising:
    a housing fastened to said first machine element;
    a scale within said housing, wherein said scale is fastened extending along said housing in a measuring direction;
    a scanning device for scanning said scale;
    a linear guide device comprising:
        a guide rail, which is rigidly assigned to said housing and includes a guide area; and
        a guide carriage, which supports said scanning device and is guided on said guide rail along said housing in said measuring direction, wherein said guide carriage is connected to said guide rail, free of play in all directions perpendicular to said measuring direction and said guide carriage comprises a fastener to fasten said guide carriage rigidly on said second machine element in said measuring direction and said all directions perpendicular to said measuring direction;
    wherein said housing is structured so that during measuring operations it is deflected perpendicular to said measuring direction at least in said guide area, so that in the course of movement of said guide carriage in a direction perpendicular to said measuring direction said housing is taken along in said direction perpendicular to said measuring direction.

2. The linear measuring device in accordance with claim 1, wherein said guide rail is constituted by an exterior face of said housing.

3. The linear measuring device in accordance with claim 2, wherein said housing is tube-shaped and has a circular-cylindrical circumferential area defining said guide area of said guide rail, wherein said guide carriage is guided on said guide area, free of play and with a degree of freedom in said measuring direction, as well as with a rotary degree of freedom around a longitudinal axis of said housing.

4. The linear measuring device in accordance with claim 1, wherein said scanning device is rigidly connected with said guide carriage in said measuring direction and in said all directions perpendicular to said measuring direction.

5. The linear measuring device in accordance with claim 1, wherein said scale comprises a measuring structure, which can be photo-electrically scanned and wherein said scanning device comprises at least one light source and a light-sensitive detector.

6. The linear measuring device in accordance with claim 1, wherein said scale is arranged inside said housing, and wherein said scanning device comprises:
    at least one light source; and
    a light-sensitive detector outside of said housing for scanning said scale via a light beam through said housing, for which purpose said housing is transparent to said light beam at least in a circumferential scanning area.

7. The linear measuring device in accordance with claim 1, wherein said scale is fastened on an interior wall along said housing.

8. The linear measuring device in accordance with claim 7, wherein said scale is a linearly rigid steel tape of low flexural strength.

9. The linear measuring device in accordance with claim 1, wherein said housing is linearly rigid and has flexural strength.

10. The linear measuring device in accordance with claim 9, wherein said housing comprises a first mounting element with a first connector located at one end of said housing and a second mounting element with a second connector located at another end of said housing and wherein said first connector and said second connector hold said housing on said first and second mounting elements deflectable perpendicular to said measuring direction.

11. The linear measuring device in accordance with claim 10, wherein said first connector connects said housing so as to be linearly movable with respect to said first mounting element, and said second connector connects said housing rigidly in said measuring direction with respect to said second mounting element.

12. The linear measuring device in accordance with claim 1, wherein said housing is linearly rigid and has low flexural strength. which can be scanned by a transmitted light scanning process, such as represented in FIG. 3. In this case the scale 200 has again been fastened on the housing 3 via a support, or directly, and the scanning device 2 is placed protectively in the interior of the housing 3. On one side of the scale 200, the scanning device 2 has a light source 21, and on the other side of the scale 200 a light-sensitive detector 22. The housing 3 is slit, and this slit 23 is sealed by an elastic seal 24, through which protrudes a sword-shaped connector 25, which rigidly connects the scanning device 2 with the guide carriage 10 in all directions X, Y, Z.

\* \* \* \* \*